(12) United States Patent
Yasuma

(10) Patent No.: US 6,625,095 B1
(45) Date of Patent: Sep. 23, 2003

(54) SIMPLIFIED OPTICAL DISC WRITING APPARATUS MAKING A HOST SYSTEM PROCESS AT LEAST ONE PART OF A DIGITAL SIGNAL PROCESSING PORTION

(75) Inventor: Toshihiko Yasuma, Fujisawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 362 days.

(21) Appl. No.: 09/692,738

(22) Filed: Oct. 19, 2000

(30) Foreign Application Priority Data

Oct. 20, 1999 (JP) ............................................. 11-297789

(51) Int. Cl.7 ................................................. G11B 7/00
(52) U.S. Cl. ................................. 369/47.19; 369/124.04
(58) Field of Search ....................... 369/124.04, 124.05, 369/59.27, 84, 47.19, 47.2

(56) References Cited

U.S. PATENT DOCUMENTS 4,998,234 A * 3/1991 Rees et al. .................. 369/124

* cited by examiner

Primary Examiner—Nabil Hindi
(74) Attorney, Agent, or Firm—Frishauf, Holtz, Goodman & Chick, P.C.

(57) ABSTRACT

A simplified optical disc writing apparatus that is connectable to a host system is provided in which at least one part of a digital signal processing portion (123, 124, 131, 132) is carried out in the host system (200) by using software (300). Picked up from a first optical disc (11) by a pickup (110), amplified by an RF amplifier (121), and binary coded by a binary coding circuit (122), a binary coded signal is supplied to the host system (200) through a host interface (210). The software (300) carries out a processing for EFM demodulating the binary coded signal, a processing for decoding the EFM demodulated signal, a processing for encoding user data, and a processing for EFM modulating the encoding processed signal. The EFM modulated signal is added with a strategy in a strategy adding circuit (133), and is converted into a laser driving signal in a laser driver (134). Responsive to the laser driving signal, the pickup (110) writes data in a second optical disc (12).

8 Claims, 14 Drawing Sheets

SIMPLIFIED OPTICAL DISC WRITING APPARATUS MAKING A HOST SYSTEM PROCESS AT LEAST ONE PART OF A DIGITAL SIGNAL PROCESSING PORTION

BACKGROUND OF THE INVENTION:

This invention relates to an optical disc writing apparatus connected to a host system and, more specifically, a simplified optical disc writing apparatus which can read data from a first optical disc, supply the read data to the host system, and then write data supplied from the host system in a second optical disc.

In the manner known in the art, an electronic device such as a personal computer may be connected to various peripheral units one of which comprises a memory device or a recording medium. In addition, there are various types of known memory devices (recording media). The memory devices (recording media) are classified into removable media and non-removable media. One type of removable media comprises a compact disc-recordable (CD-R) disc. The CD-R disc is an additionally recordable medium which is compatible with a compact disc read only memory (CD-ROM) disc or a compact disc-digital audio (CD-DA) disc. Although to write information (data) in the CD-R disc requires an exclusive apparatus or a CD-R drive and a writing application, to read the information (data) from the CD-R disc may be carried out by using a CD-ROM drive. Although it is impossible for the CD-R disc to cancel the data once written, it is possible for the CD-R disc to frequently add data.

In addition, as one type of an erasable and rewritable optical discs, a compact disc-rewritable (CD-RW) disc, a digital versatile disc-random access memory (DVD-RAM) disc, and a magneto-optical (MO) disc are well known in the art. In each of the CD-RW disc and the DVD-RAM disc, information (data) is written with a phase change recording therein. The MO disc is a disc-shaped optical memory where information (data) is written using a thermomagnetic effect of a magnetic thin film therein and information (data) is read using a photomagnetic effect therefrom. The additionally recordable media (optical discs) such as the CD-R disc, the CD-RW disc, the DVD-RAM disc, and the MO disc are herein collectively called additionally recordable optical discs.

Now, in order to write information (data) in the additionally recordable optical disc, a recording/reproducing optical pickup (which is hereunder merely referred to a pickup) requires for irradiating a laser beam on the additionally recordable optical disc.

In general, the pickup of the type described comprises a laser optical source for outputting the laser beam and an optical system for guiding the outputted laser beam to a recording medium such as an optical disc. As described above, it is possible for each additionally recordable optical disc to carry out not only reading of information but also writing of information. In the pickup for the additionally recordable optical disc, it is necessary to change output or power of the laser beam outputted by the laser optical source either on reading of information or on writing of information. This is because writing of information is carried out by forming pits in a recording layer of the optical disc by irradiating of the laser beam. Accordingly, the output of the laser beam on writing of information is larger than that on reading of information and is, for example, ten to twenty times as large as that on reading of information.

Now, it will be assumed that first and second optical discs are prepared. The first optical disc may be the CD-ROM disc or the CD-DA disc. The second optical disc may be the additionally recordable optical disc such as the CD-R disc, the CD-RW disc, the DVD-RAM disc, or the MO disc. There is the need to write contents of the first optical disc in the second optical disc. For this purpose, an optical disc writing apparatus is used or necessary in cooperation with a host system. Specifically, the optical disc writing apparatus reads, as read data, data from the first optical disc and supplies the read data to the host system to temporally store the read data. In addition, the optical disc writing apparatus writes data supplied from the host system in the second optical disc.

In the manner which will later be described in conjunction with FIG. 1, a conventional optical disc writing apparatus contains a digital signal processing portion. Accordingly, the conventional optical disc writing apparatus is disadvantageous in that a lot of parts are required and it is complicated in structure.

SUMMARY OF THE INVENTION

It is therefore an object of the present invention to provide a simplified optical disc writing apparatus which is capable of reducing the number of parts.

Other objects of this invention will become clear as the description proceeds.

On describing the gist of this invention, it is possible to be understood that a simplified optical disc writing apparatus is connected a host system. The simplified optical disc writing apparatus reads, read data, data from a first optical disc to supply the read data to the host system. The simplified optical disc writing apparatus writs, in a second optical disc, data supplied from the host system.

According to a general aspect of this invention, the above-understood simplified optical disc writing apparatus makes the host system process at least one part of a digital signal processing portion by using software stored in the host system. The simplified optical disc writing apparatus comprises at least a pickup for reading data from the first optical disc to produce a radio frequency (RF) signal, the pickup writing, in response to a laser driving signal, data in the second optical disc, a radio frequency (RF) amplifier for amplifying the RF signal to produce an amplified signal, a binary coding circuit for binary coding the amplified signal to produce a binary coded signal, a strategy adding circuit for adding a strategy to an eight to fourteen modulation (EFM) modulated signal supplied from the host system to produce a strategy added signal, and a laser driver for producing the laser driving signal in response to the strategy added signal.

According to a first aspect of this invention, the above-understood simplified optical disc writing apparatus supplies the binary coded signal to the host system. The simplified optical disc writing apparatus makes the host system carry out, by using the software, an EFM demodulating processing for EFM demodulating the binary coded signal to produce EFM demodulated data and a decoding processing for decoding the EFM demodulated data. The simplified optical disc writing apparatus makes the host system carry out, by using the software, an encoding processing for encoding user data to be written to produce encoding processed data and an EFM modulating processing for EFM modulating the encoding processed data to produce the EFM modulated signal. The simplified optical disc writing apparatus receives the EFM modulated signal from the host system.

According to a second aspect of this invention, the above-understood simplified optical disc writing apparatus further comprises an EFM demodulating circuit for EFM demodulating the binary coded signal to produce EFM demodulated data. The simplified optical disc writing apparatus supplies the EFM demodulated data to the host system. The simplified optical disc writing apparatus makes the host system carry out, by using the software, a decoding processing for decoding the EFM demodulated data. The simplified optical disc writing apparatus makes the host system carry out, by using the software, an encoding processing for encoding user data to be written to produce encoding processed data and an EFM modulating processing for EFM modulating the encoding processed data to produce the EFM modulated signal. The simplified optical disc writing apparatus receives the EFM modulated signal from the host system.

According to a third aspect of this invention, the above-understood simplified optical disc writing apparatus supplies the binary coded signal to the host system. The simplified optical disc writing apparatus makes the host system carry out, by using the software, an EFM demodulating processing for EFM demodulating the binary coded signal to produce EFM demodulated data and a decoding processing for decoding the EFM demodulated data. The simplified optical disc writing apparatus makes the host system carry out, by using the software, an encoding processing for encoding user data to be written to produce encoding processed data. The simplified optical disc writing apparatus receives the encoding processed data from the host system. The simplified optical disc writing apparatus further comprises an EFM modulating circuit for EFM modulating the encoding processed data to produce the EFM modulated signal.

According to a fourth aspect of this invention, the above-understood simplified optical disc writing apparatus further comprises an EFM demodulating circuit for EFM demodulating the binary coded signal to produce EFM demodulated data and a decoding processing circuit for decoding the EFM demodulated data to produce decoding processed data. The simplified optical disc writing apparatus supplies the decoding processed data to the host system. The simplified optical disc writing apparatus makes the host system carry out, by using the software, an encoding processing for encoding user data to be written to produce encoding processed data and an EFM modulating processing for EFM modulating the encoding processed data to produce the EFM modulated signal. The simplified optical disc writing apparatus receives the EFM modulated signal from the host system.

According to a fifth aspect of this invention, the above-understood simplified optical disc writing apparatus supplies the binary coded signal to the host system. The simplified optical disc writing apparatus makes the host system carry out, by using the software, an EFM demodulating processing for EFM demodulating the binary coded signal to produce EFM demodulated data and a decoding processing for decoding the EFM demodulated data. The simplified optical disc writing apparatus receives user data to be written from the host system. The simplified optical disc writing apparatus further comprises an encoding processing circuit for encoding the user data to produce encoding processed data and an EFM modulating circuit for EFM modulating the encoding processed data to produce the EFM modulated signal.

According to a sixth aspect of this invention, the above-understood simplified optical disc writing apparatus further comprises an EFM demodulating circuit for EFM demodulating the binary coded signal to produce EFM demodulated data. The simplified optical disc writing apparatus supplies the EFM demodulated data to the host system. The simplified optical disc writing apparatus makes the host system carry out, by using the software, a decoding processing for decoding the EFM demodulated data. The simplified optical disc writing apparatus makes the host system carry out, by using the software, an encoding processing for encoding user data to be written to produce encoding processed data. The simplified optical disc writing apparatus receives the encoding processed data from the host system. The simplified optical disc writing apparatus further comprises an EFM modulating circuit for EFM modulating the encoding processed data to produce the EFM modulated signal.

According to a seventh aspect of this invention, the above-understood simplified optical disc writing apparatus further comprises an EFM demodulating circuit for EFM demodulating the binary coded signal to produce EFM demodulated data. The simplified optical disc writing apparatus supplies the EFM demodulated data to the host system. The simplified optical disc writing apparatus makes the host system carry out, by using the software, a decoding processing for decoding the EFM demodulated data. The simplified optical disc writing apparatus receives user data to be written from said host system. The simplified optical disc writing apparatus further comprises an encoding processing circuit for encoding the user data to produce encoding processed data and an EFM modulating circuit for EFM modulating the encoding processed data to produce the EFM modulated signal.

According to an eighth aspect of this invention, the above-understood simplified optical disc writing apparatus further comprises an EFM demodulating circuit for EFM demodulating the binary coded signal to produce EFM demodulated data and a decoding processing circuit for decoding the EFM demodulated data to produce decoding processed data. The simplified optical disc writing apparatus supplies the decoding processed data to the host system. The simplified optical disc writing apparatus makes the host system carry out, by using the software, an encoding processing for encoding user data to be written to produce encoding processed data. The simplified optical disc writing apparatus receives the encoding processed data from the host system. The simplified optical disc writing apparatus further comprises an EFM modulating circuit for EFM modulating the encoding processed data to produce the EFM modulated signal.

DESCRIPTION OF THE PREFERRED EMBODIMENT

Figure 1:
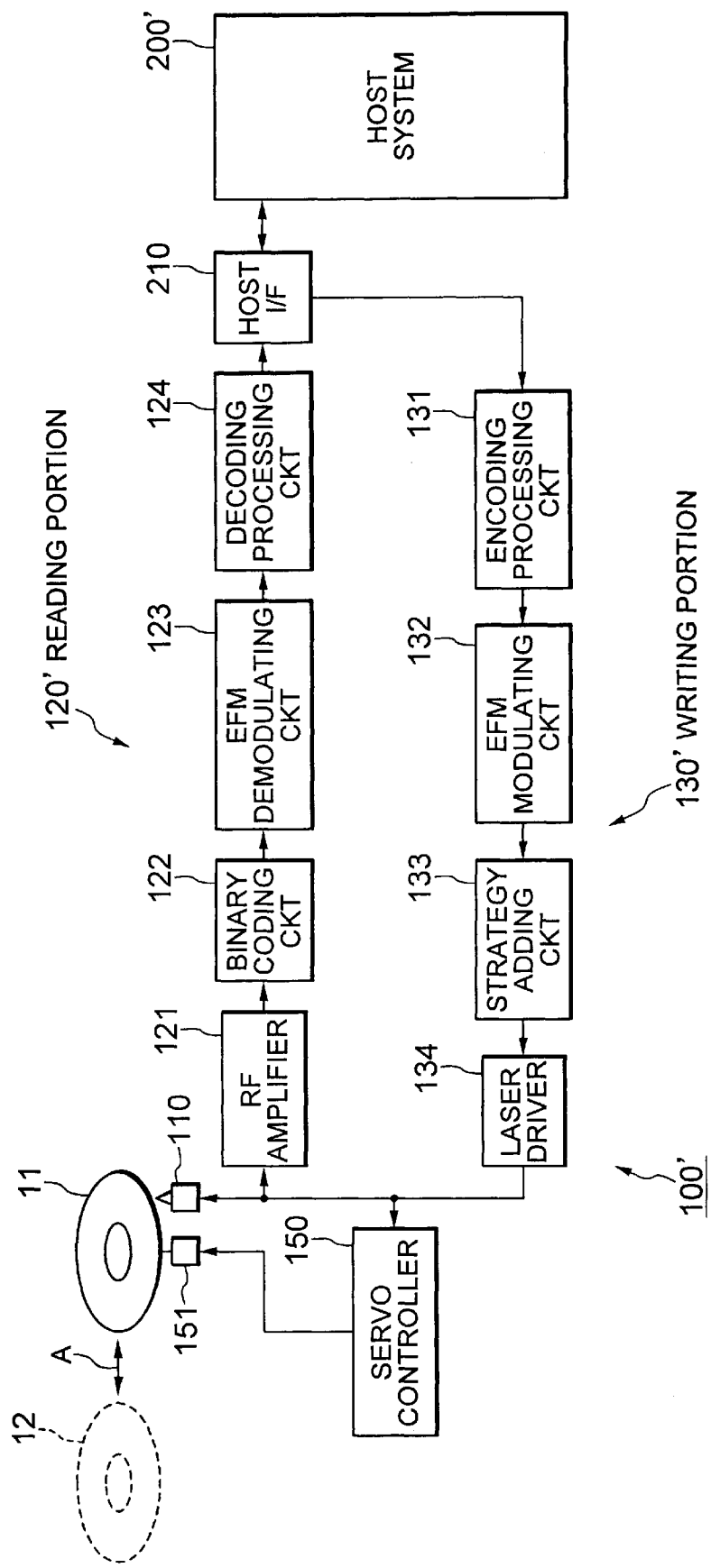
FIG. 1 is a block diagram showing a conventional optical disc writing apparatus together with a host system connected thereto.

Referring to FIG. 1, description will proceed a conventional optical disc writing apparatus at first in order to facilitate an understanding of the present invention. FIG. 1 illustrates a conventional optical disc writing apparatus 100' together with a conventional host system 200'. The optical disc writing apparatus 100' is for writing, in cooperation with the host system 200', contents of a first optical disc 11 in a second optical disc 12. The first optical disc 11 may be a CD-ROM disc or a CD-DA disc. The second optical disc 12 may be an additionally recordable optical disc such as a CD-R disc, a CD-RW disc, a DVD-RAM disc, or a MO disc.

The illustrated optical disc writing apparatus 100' is connected to the host system 200' through a host interface (I/F) 210. The optical disc writing apparatus 100' is an apparatus which enables to read, read data, data from the first optical disc 11 to supply the read data to the host system 200' through the host interface 210 and which enables to receive, supplied data, data supplied from the host system 200' through the host interface 210 to write the supplied data in the second optical disc 12. In addition, the optical disc writing apparatus 100' is called a drive.

The optical disc writing apparatus 100' comprises a pickup 110 for reading data from the first optical disc 11 to produce a radio frequency (RF) signal and for writing, in response to a laser driving signal which will later described, data in the second optical disc 12, a reading portion 120' for supplying the host system 200' through the host interface 210 with the read data from the first optical disc 11 by using the pickup 110, a writing portion 130' for writing, in the second optical disc 12 by using the pickup 110, the supplied data from the host system 200' through the host interface 210.

The optical disc writing apparatus 100' is operable in either a reading mode or a writing mode. In the reading mode, the first optical disc 11 is loaded in the optical disc writing apparatus 100' as illustrated at a solid line in FIG. 1 and the reading portion 120' is put into an activated state. In the writing mode, the second optical disc 12 is loaded in the optical disc writing apparatus 100' by replacing the first optical disc 11 with the second optical disc 12 as illustrated at an arrow A in FIG. 1 and the writing portion 130' is put into an activated state.

The reading portion 120' comprises a radio frequency (RF) amplifier 121 connected to the pickup 110, a binary coding circuit 122 connected to the RF amplifier 121, an eight to fourteen modulation (EFM) demodulating circuit 123 connected to the binary coding circuit 122, a decoding processing circuit 124 connected to the EFM demodulating circuit 123 and to the host interface 210. Supplied with the RF signal from the pickup 110, the FR amplifier 121 amplifies the RF signal to produce an amplified signal. Supplied with the amplified signal from the RF amplifier 121, the binary coding circuit 122 binary codes the amplified signal to produce a binary coded signal. Supplied with the binary coded signal from the binary coded signal, the EFM demodulating circuit 123 EFM demodulates the binary coded signal to produce an EFM demodulated signal. Supplied with the EFM demodulated signal from the EFM demodulating circuit 123, the decoding processing circuit 124 decodes the EFM demodulated signal to produce a decoding processed signal.

The decoding processed signal is supplied to the host system 200' through the host interface 210. In addition, the decoding processing circuit 124 carries out, on the EFM demodulated signal, extraction of necessary data, an error detection, an error collection, and so on. Furthermore, a combination of the EFM demodulating circuit 123 and the decoding processing circuit 124 is called a decoder (123, 124).

On the other hand, the writing portion 130' comprises an encoding processing circuit 131 connected to the host interface 210, an EFM modulating circuit 132 connected to the encoding processing circuit 131, a strategy adding circuit 133 connected to the EFM modulating circuit 132, and a laser driver 134 connected to the strategy adding circuit 133 and to the pickup 110. The encoding processing circuit 131 is supplied with user data from the host system 200' through the host interface 210. The encoding processing circuit 131 encodes the user data to produce encoding processed data. Supplied with the encoding processed data from the encoding processing circuit 131, the EFM modulating circuit 132 EFM modulates the encoding processed data to produce an EFM modulated signal. Supplied with the EFM modulated signal from the EFM modulating circuit 132, the strategy adding circuit 133 adds a strategy to the EFM modulated signal to produce a strategy added signal. Responsive to the strategy added signal, the laser driver 134 produces the above-mentioned laser driving signal.

The laser driving signal is sent to the pickup 110. The encoding processing circuit 131 carries out, on the user data, an addition of an error code, a CD format transformation, and so on. In addition, the "strategy" means performing optimization to match the second optical disc 12 with the first optical disc 11. Furthermore, a combination of the encoding processing circuit 131 and the EFM modulating circuit 132 is called an encoder (131, 132).

In addition, inasmuch as signal processing is digitally carried out in both the decoder (123, 124) and the encoder (131, 132), the decoder and the encoder are collectively called a digital signal processing portion (123, 124, 131, 132).

The optical disc writing apparatus 100' further comprises a servo controller 150 and a spindle motor 151 for rotatably driving an optical disc (namely, the first optical disc 11 or the second optical disc 12). The servo controller 150 controls the spindle motor 151.

As described above, the conventional optical disc writing apparatus 100' contains the digital signal processing portion (123, 124, 131, 132). As a result, the conventional optical disc writing apparatus 100' is disadvantageous in that a lot of parts are required and it is complicated in structure, as mentioned in the preamble of the instant specification.

Figure 2:
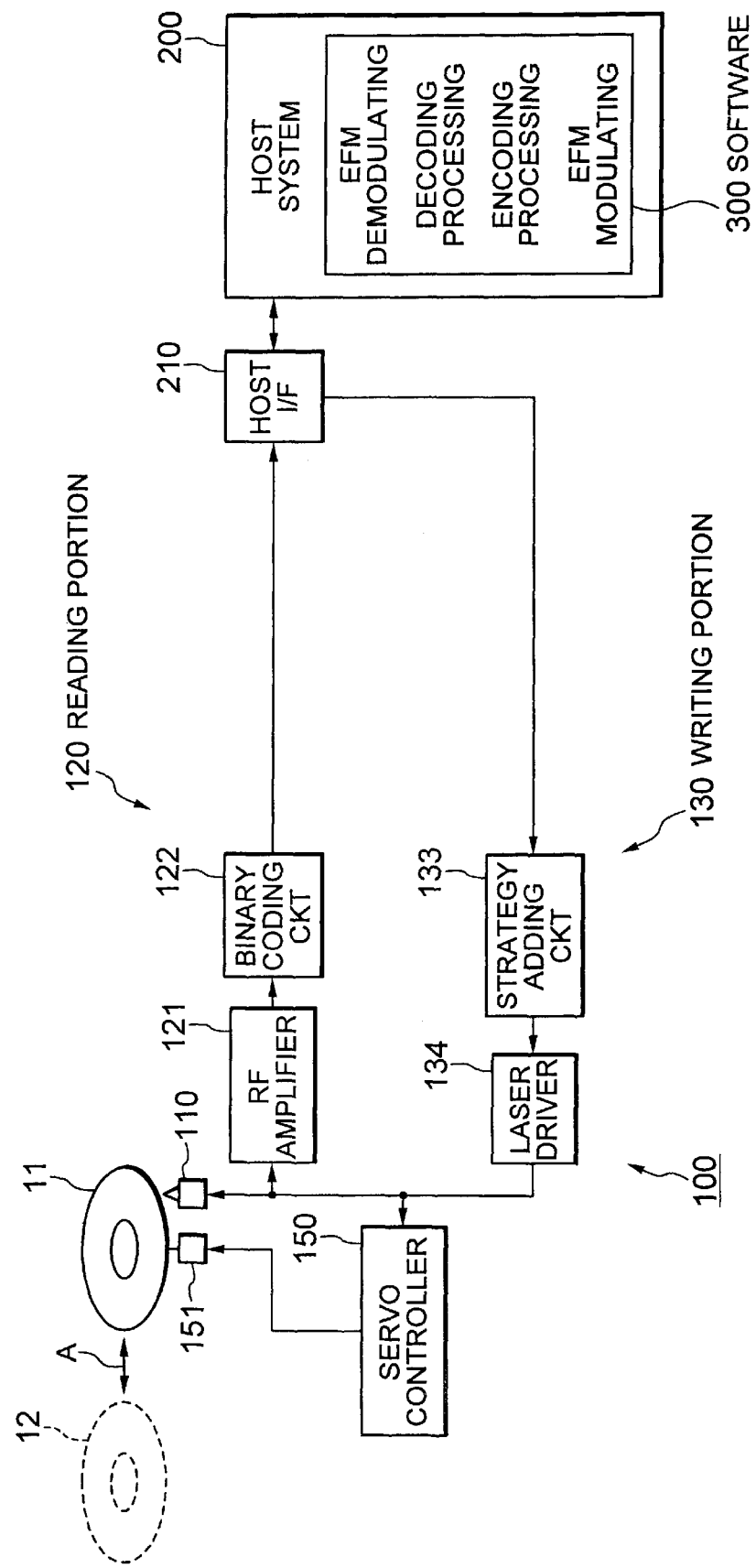
FIG. 2 is a block diagram showing an optical disc writing apparatus according to a first embodiment of this invention together with a host system connected thereto.

Referring to FIG. 2, the description will proceed to a simplified optical disc writing apparatus 100 according to a first embodiment of this invention. The illustrated simplified optical disc writing apparatus 100 is similar in structure and operation to the conventional optical disc writing apparatus 100' illustrated in FIG. 1 except that the reading portion and the writing portion are different in structure from those in illustrated in FIG. 1. Accordingly, the reading portion and the writing portion are depicted at symbols of 120 and 130, respectively.

In addition, inasmuch as structure of the simplified optical disc writing apparatus 100 is modified from the conventional optical disc writing apparatus 100', the host system connected to this optical disc writing apparatus 100 is also different from that illustrated in FIG. 1 in the manner which will later become clear. Accordingly, the host system is depicted at a symbol of 200.

The reading portion 120 consists of the RF amplifier 121 and the binary coding circuit 122. In other words, the reading portion 120 is a portion obtained by deleting both the EFM demodulating circuit 123 and the decoding processing circuit 124 (namely, the decoder (123, 124) which consists of one part of the digital signal processing portion) from the conventional reading portion 120'.

On the other hand, the writing portion 130 consists of the strategy adding circuit 133 and the laser driver 134. In other words, the writing portion 130 is a portion obtained by deleting both the encoding processing circuit 131 and the EFM modulating circuit 132 (namely, the encoder (131, 132) which consists of a remaining part of the digital signal processing portion) from the conventional writing portion 130'.

That is, the simplified optical disc writing apparatus 100 according to the first embodiment is an apparatus obtained by deleting all the digital signal processing portion (123, 124, 131, 132) from the conventional optical disc writing apparatus 100'.

In the manner which is described above, inasmuch as all the digital signal processing portion (123, 124, 131, 132) is deleted from the conventional optical writing apparatus 100', in place of this, the host system 200 carries out, by using software 300, a processing carried out by the digital signal processing portion (123, 124, 131, 132).

At any rate, inasmuch as all the digital signal processing portion (123, 124, 131, 132) contained in the conventional optical disc writing apparatus 100' is deleted from the conventional optical disc writing apparatus 100', it is possible for the simplified optical disc writing apparatus 100 according to the first embodiment of this invention to reduce the number of parts in comparison with the conventional optical disc writing apparatus 100' and it results in simplifying circuitry in the optical disc writing apparatus 100.

With this structure, in the reading mode, the binary coded signal produced by the binary coding circuit 122 is supplied to the host system 200 through the host interface 210. Responsive to the binary coded signal, the host system 200 carries out, by using the software 300, each processing of an EFM demodulating processing, a decoding processing, an encoding processing, and an EFM modulating processing. In other words, the simplified optical disc writing apparatus 100 makes the host system 200 process all the digital signal processing portion (123, 124, 131, 132) by the software 300.

More specifically, in the reading mode, the simplified optical disc writing apparatus 100 makes the host system 200 carry out, by using the software 300, the EFM demodulating processing for EFM demodulating the binary coded signal to produce EFM demodulated data and the decoding processing for decoding the EFM demodulated data. In the writing mode, the simplified optical disc writing apparatus 100 makes the host system 200 carry out, by using the software 300, the encoding processing for encoding user data to be written to produce encoding processed data and the EFM modulating processing for EFM modulating the encoding processed data to produce the EFM modulated signal.

In the simplified optical disc writing apparatus 100, the strategy adding circuit 133 receives the EFM modulated signal from the host system through the host interface 210.

Figure 3:
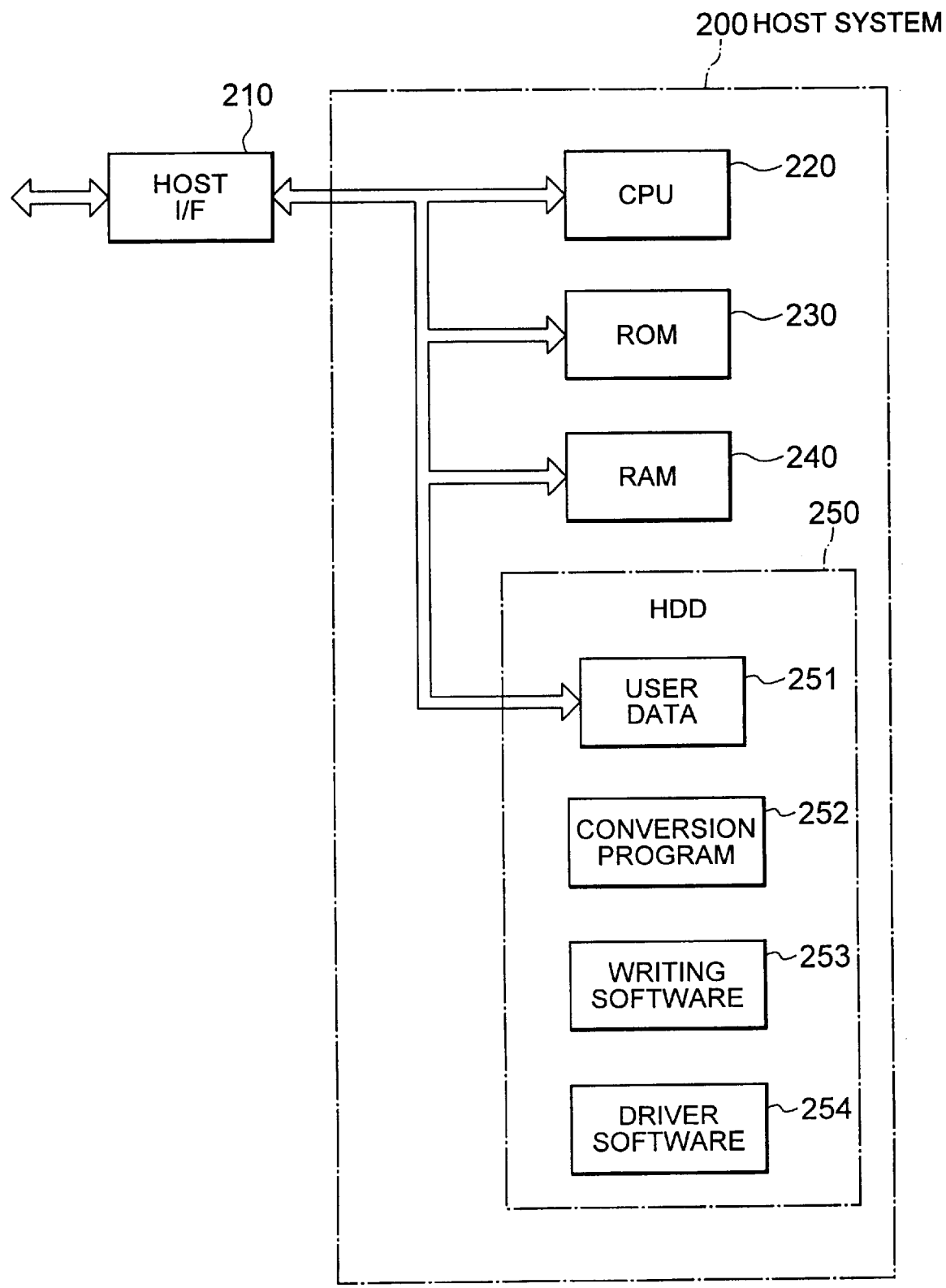
FIG. 3 is a block diagram showing a host system illustrated in FIG. 2.

Referring now to FIG. 3, the description will proceed to structure (hardware) of the host system 200. The host system 200 is connected to the host interface 210 and comprises a central processing unit (CPU) 220, a read only memory (ROM) 230, a random access memory (RAM) 240, and a hard disc drive (HDD) 250.

The hard disc drive 250 stores user data 151, a conversion or translation program 252 corresponding to the above-mentioned software 300, writing software 253, and driver software 254 for driving the optical disc writing apparatus 100 therein.

In addition, the host system 200 illustrated in FIG. 3 is an example and may be restricted to this example. For example, although the conversion program 252 is stored in the hard disc drive 250 in the example illustrated in FIG. 3, the conversion program 252 may be stored in the ROM 230 or the RAM 240.

Figure 4:
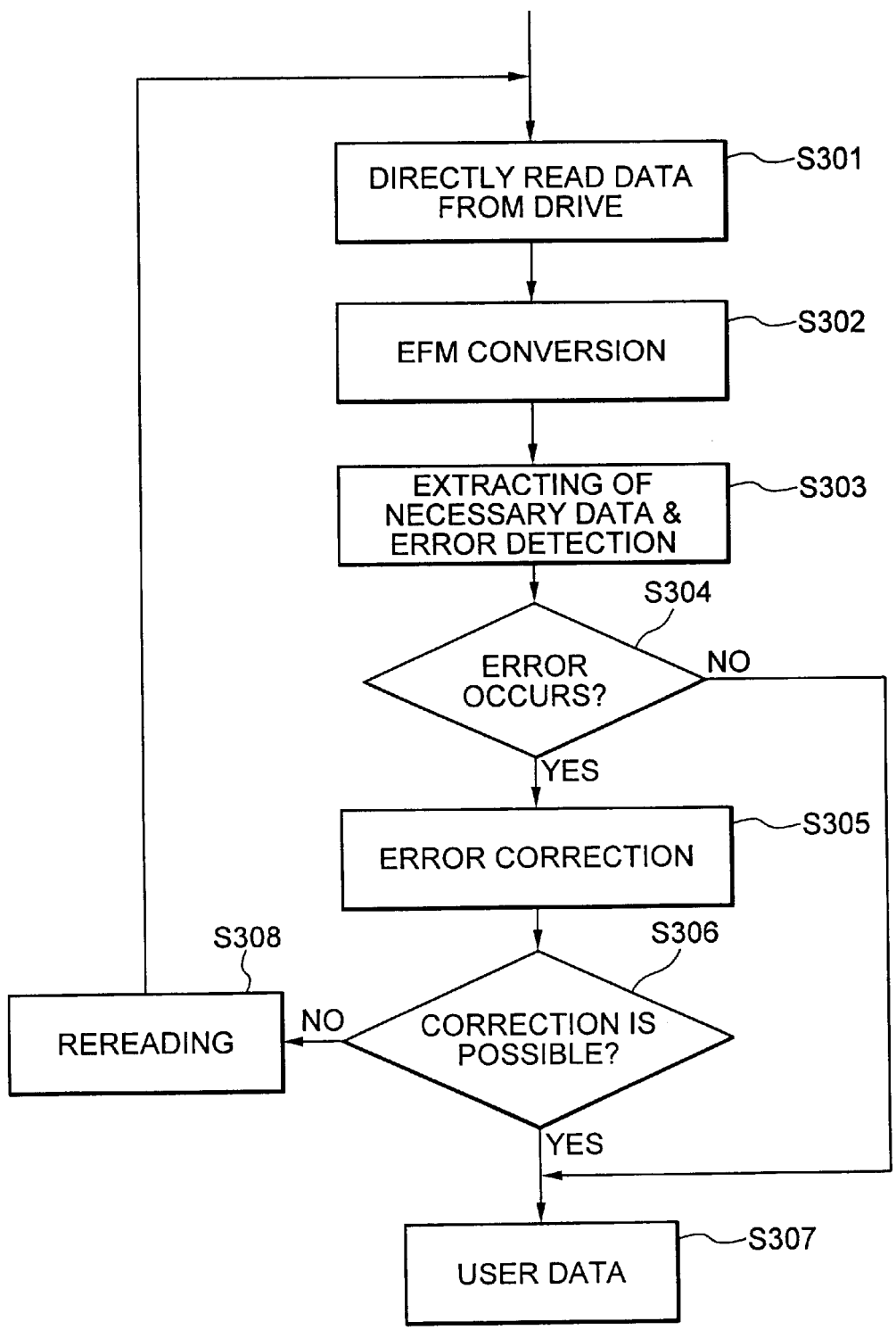
FIG. 4 is a flow chart for use in describing an operation in software of the host system illustrated in FIG. 2 in a case on reading data from a first optical disc.
Figures 5A, 5B:
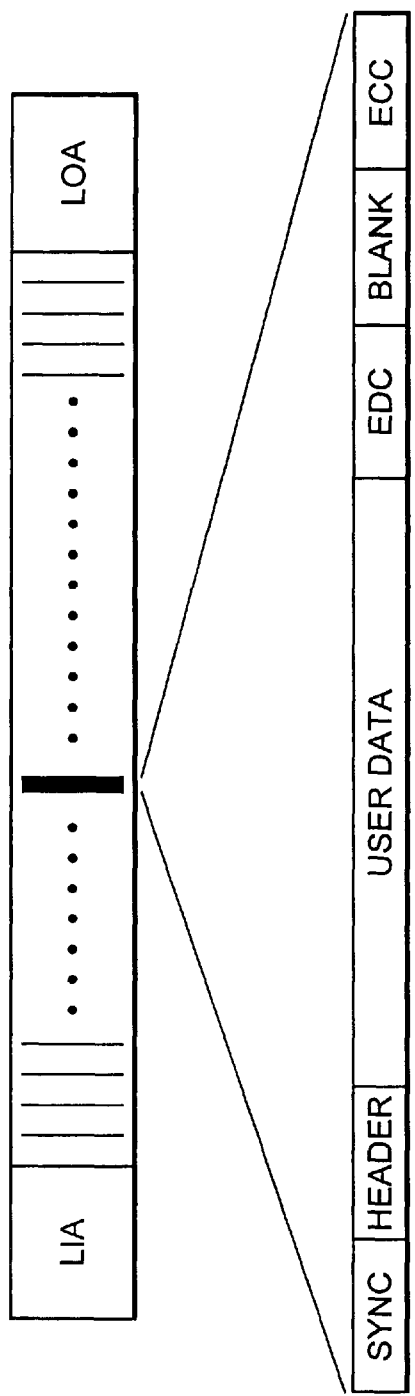
FIGS. 5A and 5B show signal formats for use in describing operation in FIG. 4.
Figure 6:
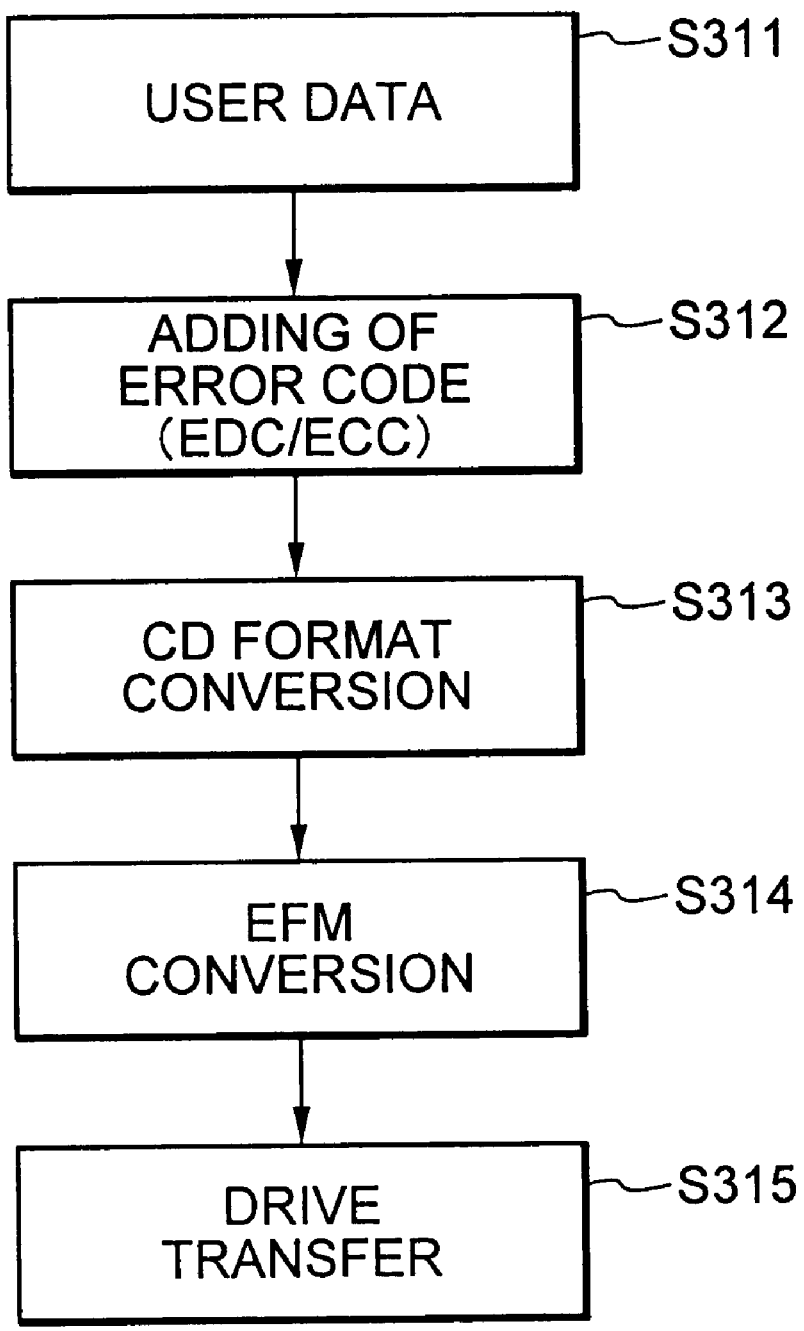
FIG. 6 is a flow chart for use in describing an operation in software of the host system illustrated in FIG. 2 in a case on writing data in a second optical disc.

Referring now to FIGS. 4, 5A, 5B, 6, 7A, and 7B, the description will proceed to a processing carried out by the software 300 in FIG. 2 (the conversion program 252 in FIG. 3). FIG. 4 illustrates operation where data is read from the first optical disc 11 while FIG. 6 illustrates operation where date is written in the second optical disc 12.

Referring first to FIG. 4, 5A, and 5B in addition to FIG. 2, the description will proceed to the operation on reading data from the first optical disc 11.

Under the control of the servo controller 150, the spindle motor 151 rotates the first optical disc 11. In this state, the pickup 110 reads data from the first optical disc 11 to produce the RF signal. Supplied with the RF signal, the RF amplifier 121 amplifies the RF signal to produce the amplified signal. Supplied with the amplified signal, the binary coding circuit 122 binary codes the amplified signal to produce the binary coded signal. The binary coded signal is supplied to the host system 200 through the host interface 210.

As shown in FIG. 4, in the host system 200, the software 300 receives the above-mentioned binary coded signal as directly read data from the drive (the simplified optical writing apparatus 100) at a step S301. The step S301 is followed by a step S302 at which the software 300 carries out an EFM conversion or translation. That is, at the step S302, the software 300 EFM demodulates the binary coded signal to produce the EFM demodulated data. More specifically, the software 300 converts data of fourteen bits into data of eight bits. The converted data has a data structure illustrated in FIG. 5A. That is, the converted data comprises a read in area (LIA), a user data area, and a read out area (LOA). The user data area stores a plurality of data blocks (sectors) each of which is illustrated in FIG. 5B. That is, each data block comprises a synchronization field (SYNC), a header field (HEADER), a user data field (USER DATA), an EDC field (EDC), a blank field (BLANK), and an ECC field (ECC). The EFM conversion at the step S302 corresponds to an EFM demodulation which is carried out by the EFM demodulating circuit 123 (FIG. 1).

The step S302 proceeds to a step S303 at which the software 300 extracts necessary data (that is, a part of the user data field (USER DATA) in FIG. 5B) as extracted user data and detects, by using an error detection code (EDC) of the EDC field, whether or not any error occurs in the extracted user data. If any error occurs (YES in a step S304), the software 300 corrects, by using an error correcting code (ECC) of the ECC field, the error in the extracted user data at a step S305. If error correction is possible (YES in a step S306), the software 300 takes error-corrected data as the user data 251 (FIG. 3) in the hard disc drive 250 at a step S307.

In addition, the software 300 judges at the step S304 that no error occurs (NO in a step S304), the step S304 is also succeeded by the step S307 at which the software 300 takes the extracted user data as the user data 251 in the hard disc drive 250.

On the other hand, the software 300 judges at the step S306 that error correction is not possible (NO in the step S306), the step S306 is followed by a step S308 at which the software 300 instructs rereading to turn back to the step S301 again in order to repeat the above-mentioned operation.

A processing from the step S303 to the step S306 corresponds to a processing for decoding the EFM demodulated data, namely, to a decoding processing which is carried out by the decoding processing circuit 124 (FIG. 1). The above-mentioned operation is an operation on reading data from the first optical disc 11.

Figures 7A, 7B:
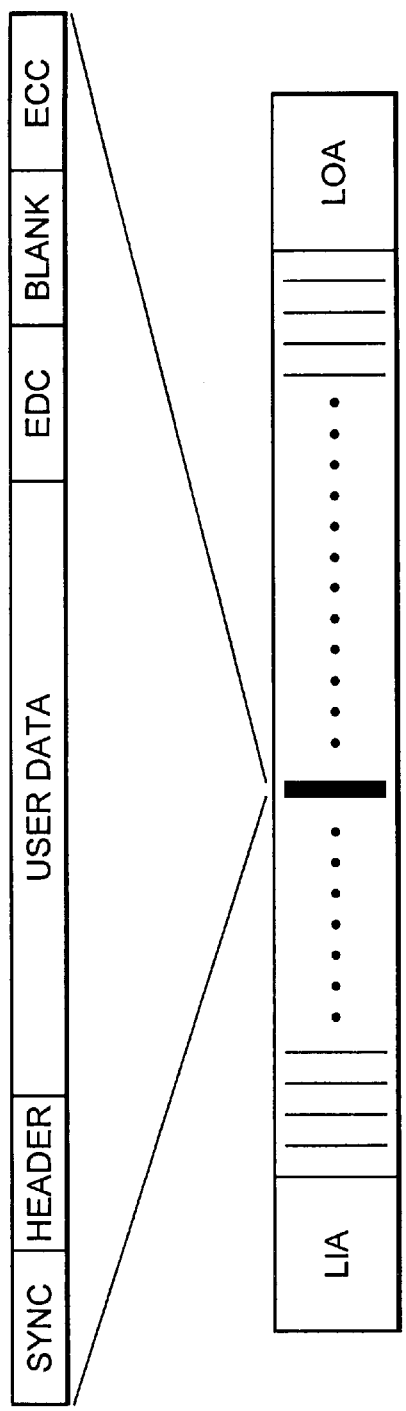
FIGS. 7A and 7B show signal formats for use in describing operation in FIG. 6.

Next, referring to FIGS. 6, 7A, and 7B in addition to FIG. 2, the description will proceed to the operation on writing the user data 251 (FIG. 3) in the second optical disc 12.

In this event, the first optical disc 11 is first replaced to the second optical disc 12 as illustrated in the arrow A in FIG. 2. Under the circumstances, under the control of the servo controller 150, the spindle motor 151 is driven to rotate the second optical disc 12.

In this state, the software 300 first obtains the user data 251 to be written at a step S311. The step S311 proceeds to a step S312 at which the software 300 adds an error code (EDC/ECC) to the user data 251. Data obtained by this processing is data as illustrated in FIG. 7A. That is, this data is identical with that illustrated in FIG. 5B and comprises the synchronization field (SYNC), the header field (HEADER), the user data field (USER DATA), the EDC field (EDC), the blank field (BLANK), and the ECC field (ECC). The step S312 is succeeded by a step S313 at which the software 300 carries out a CD format conversion on this data as a data block to obtain data as illustrated in FIG. 7B. The data illustrated FIG. 7B has structure which is identical with that illustrated in FIG. 5A. That is, data obtained by this conversion comprises the read in area (LIA), the user data area, and the lead out area (LOA). A processing of the step S312 and the step S313 corresponds to a processing for encoding the user data to produce the encoding processed data, namely, to the encoding processing which is carried out by the encoding processing circuit 131 (FIG. 1).

The step S313 is followed by a step S314 at which the software 300 carries out an EFM conversion on the data illustrated in FIG. 7B. That is, at the step S314, the software 300 EFM modulates the decoding processed data to produce the EFM modulated signal. Specifically, the software converts, in conformity to a CD standard, a block of eight bits to a block of fourteen bits. A processing in the step S314 corresponds to an EFM modulation which is carried out by the EFM modulating circuit 132 (FIG. 1). The step S314 proceeds to a step S315 at which the software 300 transfers the data obtained in the manner described above to the drive (the simplified optical disc writing apparatus 100).

Accordingly, the EFM modulated signal is sent from the host system 200 through the host interface 210 to the strategy adding circuit 133 in the simplified optical disc writing apparatus 100. The strategy adding circuit 133 adds the strategy to the EFM modulated signal to produce the strategy added signal. Responsive to the strategy added signal, the laser driver 134 produces the laser driving signal. Responsive to the laser driving signal, the pickup 110 writes data in the second optical disc 12. The above-mentioned operation is the operation on writing the user data 251 in the second optical disc 12.

Although all the digital signal processing portion (123, 124, 131, 132) is deleted from the conventional optical disc writing apparatus 100' in the above-mentioned first embodiment, it is not always necessary for all to delete, and a part of the digital signal processing portion may be deleted in the manner which will later described in following embodiments.

Figure 8:
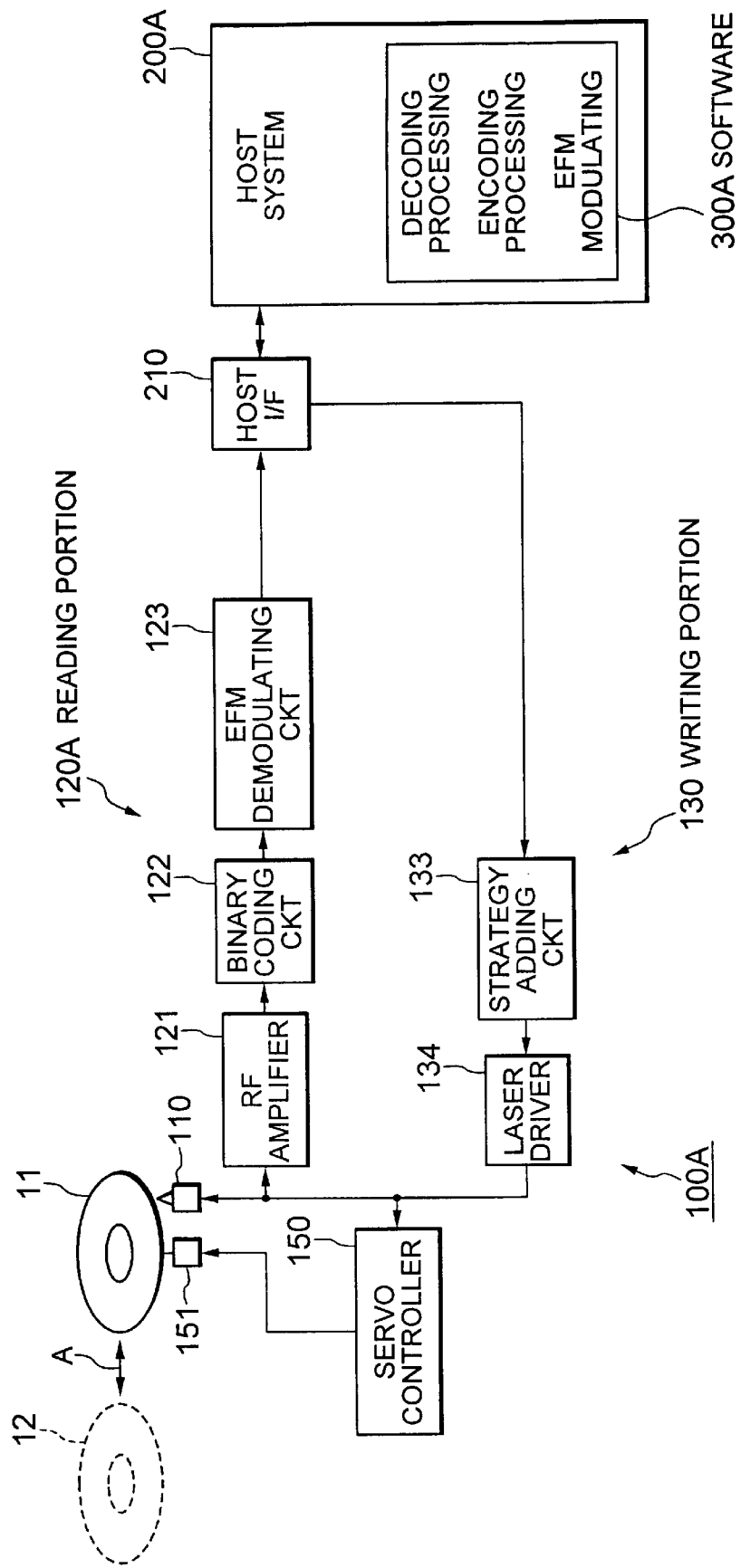
FIG. 8 is a block diagram showing an optical disc writing apparatus according to a second embodiment of this invention together with a host system connected thereto.

Referring to FIG. 8, the description will proceed to a simplified optical disc writing apparatus 100A according to a second embodiment of this invention. The illustrated simplified optical disc writing apparatus 100A is similar in structure and operation to the simplified optical disc writing apparatus 100 illustrated in FIG. 2 except that the reading portion is different in structure from that in illustrated in FIG. 2. Accordingly, the reading portion is depicted at a symbol of 120A.

In addition, inasmuch as structure of the simplified optical disc writing apparatus 100A is modified from the simplified optical disc writing apparatus 100, the host system connected to this optical disc writing apparatus 100A is also different from that illustrated in FIG. 2 in the manner which will later become clear. Accordingly, the host system is depicted at a symbol of 200A.

The reading portion 120A comprises not only the RF amplifier 121 and the binary coding circuit 122 but also the EFM demodulating circuit 123. In other words, the reading portion 120A is a portion obtained by deleting the decoding processing circuit 124 from the conventional reading portion 120'.

That is, the simplified optical disc writing apparatus 100A according to the second embodiment is an apparatus obtained by deleting a part (124, 131, 132) of the digital signal processing portion (123, 124, 131, 132) from the conventional optical disc writing apparatus 100'.

In the manner which is described above, inasmuch as the part (124, 131, 132) of the digital signal processing portion (123, 124, 131, 132) is deleted from the conventional optical writing apparatus 100', in place of this, the host system 200A carries out, by using software 300A, a processing carried out by this part (124, 131, 132) of the digital signal processing portion (123, 124, 131, 132).

At any rate, inasmuch as the part (124, 131, 132) of the digital signal processing portion (123, 124, 131, 132) contained in the conventional optical disc writing apparatus 100' is deleted from the conventional optical disc writing apparatus 100', it is possible for the simplified optical disc writing apparatus 100A according to the second embodiment of this invention to reduce the number of parts in comparison with the conventional optical disc writing apparatus 100' and it results in simplifying circuitry in the optical disc writing apparatus 100A.

Figure 9:
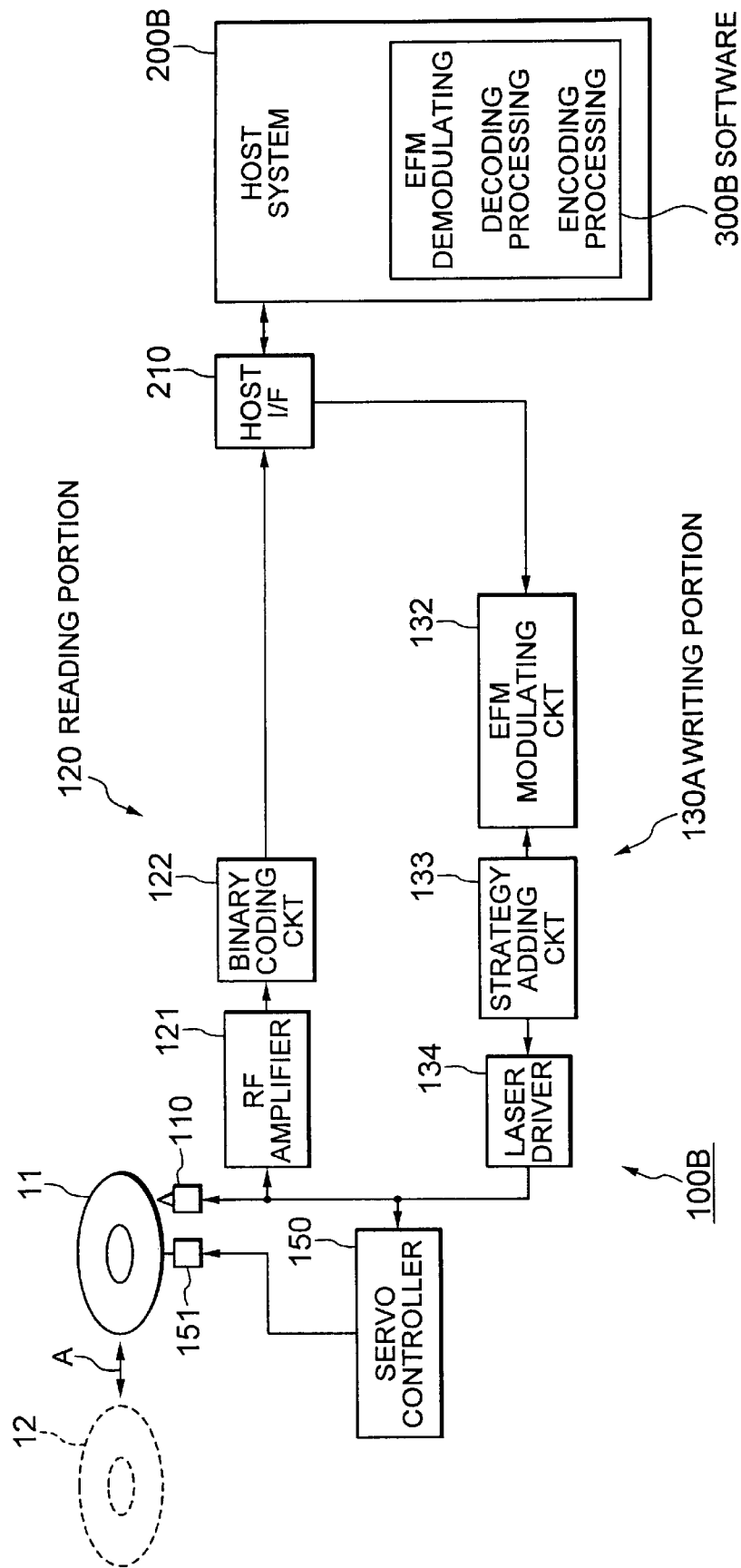
FIG. 9 is a block diagram showing an optical disc writing apparatus according to a third embodiment of this invention together with a host system connected thereto.

Referring to FIG. 9, the description will proceed to a simplified optical disc writing apparatus 100B according to a third embodiment of this invention. The illustrated simplified optical disc writing apparatus 100B is similar in structure and operation to the simplified optical disc writing apparatus 100 illustrated in FIG. 2 except that the writing portion is different in structure from that in illustrated in FIG. 2. Accordingly, the writing portion is depicted at a symbol 130A.

In addition, inasmuch as structure of the simplified optical disc writing apparatus 100B is modified from the simplified optical disc writing apparatus 100, the host system connected to this optical disc writing apparatus 100B is also different from that illustrated in FIG. 2 in the manner which will later become clear. Accordingly, the host system is depicted at a symbol of 200B.

The writing portion 130A comprises not only the strategy adding circuit 133 and the laser driver 134 but also the EFM modulating circuit 132. In other words, the writing portion 130A is a portion obtained by deleting the encoding processing circuit 131 from the conventional writing portion 130'.

That is, the simplified optical disc writing apparatus 100B according to the third embodiment is an apparatus obtained by deleting a part (123, 124, 131) of the digital signal processing portion (123, 124, 131, 132) from the conventional optical disc writing apparatus 100'.

In the manner which is described above, inasmuch as the part (123, 124, 131) of the digital signal processing portion (123, 124, 131, 132) is deleted from the conventional optical writing apparatus 100', in place of this, the host system 200B carries out, by using software 300B, a processing carried out by this part (123, 124, 131) of the digital signal processing portion (123, 124, 131, 132).

At any rate, inasmuch as the part (123, 124, 131) of the digital signal processing portion (123, 124, 131, 132) contained in the conventional optical disc writing apparatus 100' is deleted from the conventional optical disc writing apparatus 100', it is possible for the simplified optical disc writing apparatus 100B according to the third embodiment of this invention to reduce the number of parts in comparison with the conventional optical disc writing apparatus 100' and it results in simplifying circuitry in the optical disc writing apparatus 100B.

Figure 10:
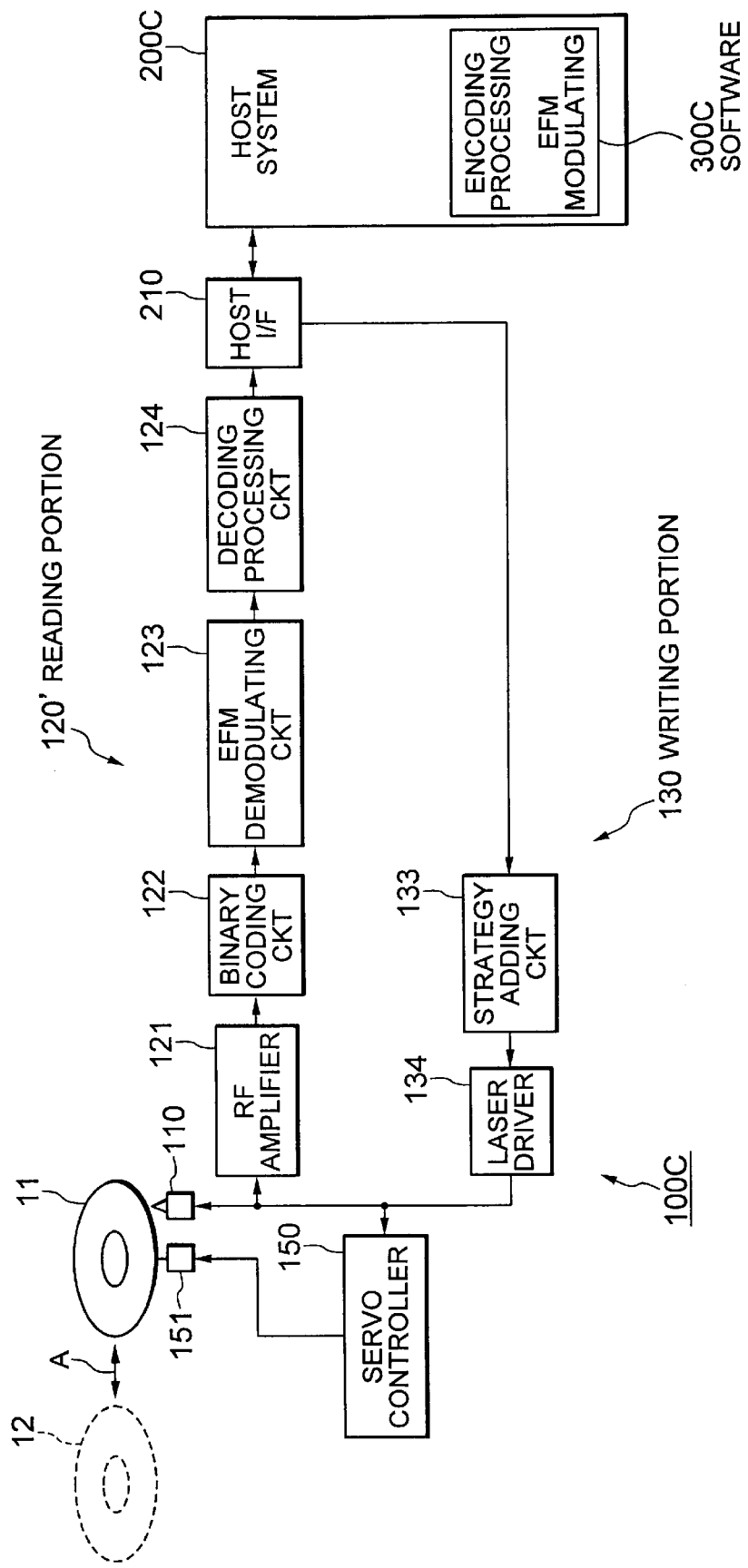
FIG. 10 is a block diagram showing an optical disc writing apparatus according to a fourth embodiment of this invention together with a host system connected thereto.

Referring to FIG. 10, the description will proceed to a simplified optical disc writing apparatus 100C according to a fourth embodiment of this invention. The illustrated simplified optical disc writing apparatus 100C is similar in structure and operation to the conventional optical disc writing apparatus 100' illustrated in FIG. 1 except that only the writing portion is modified to that in illustrated in FIG. 2.

In addition, inasmuch as structure of the simplified optical disc writing apparatus 100C is modified from the conventional optical disc writing apparatus 100', the host system connected to this optical disc writing apparatus 100C is also different from that illustrated in FIG. 1 in the manner which will later become clear. Accordingly, the host system is depicted at a symbol of 200C.

That is, the simplified optical disc writing apparatus 100C according to the fourth embodiment is an apparatus obtained by deleting a part (131, 132) of the digital signal processing portion 123, 124, 131, 132) from the conventional optical disc writing apparatus 100'.

In the manner which is described above, inasmuch as the part (131, 132) of the digital signal processing portion (123, 124, 131, 132) is deleted from the conventional optical writing apparatus 100', in place of this, the host system 200C carries out, by using software 300, a processing carried out by this part (131, 132) of the digital signal processing portion (123, 124, 131, 132).

At any rate, inasmuch as the part (131, 132) of the digital signal processing portion (123, 124, 131, 132) contained in the conventional optical disc writing apparatus 100' is deleted from the conventional optical disc writing apparatus 100', it is possible for the simplified optical disc writing apparatus 100C according to the fourth embodiment of this invention to reduce the number of parts in comparison with the conventional optical disc writing apparatus 100' and it results in simplifying circuitry in the optical disc writing apparatus 100C.

Figure 11:
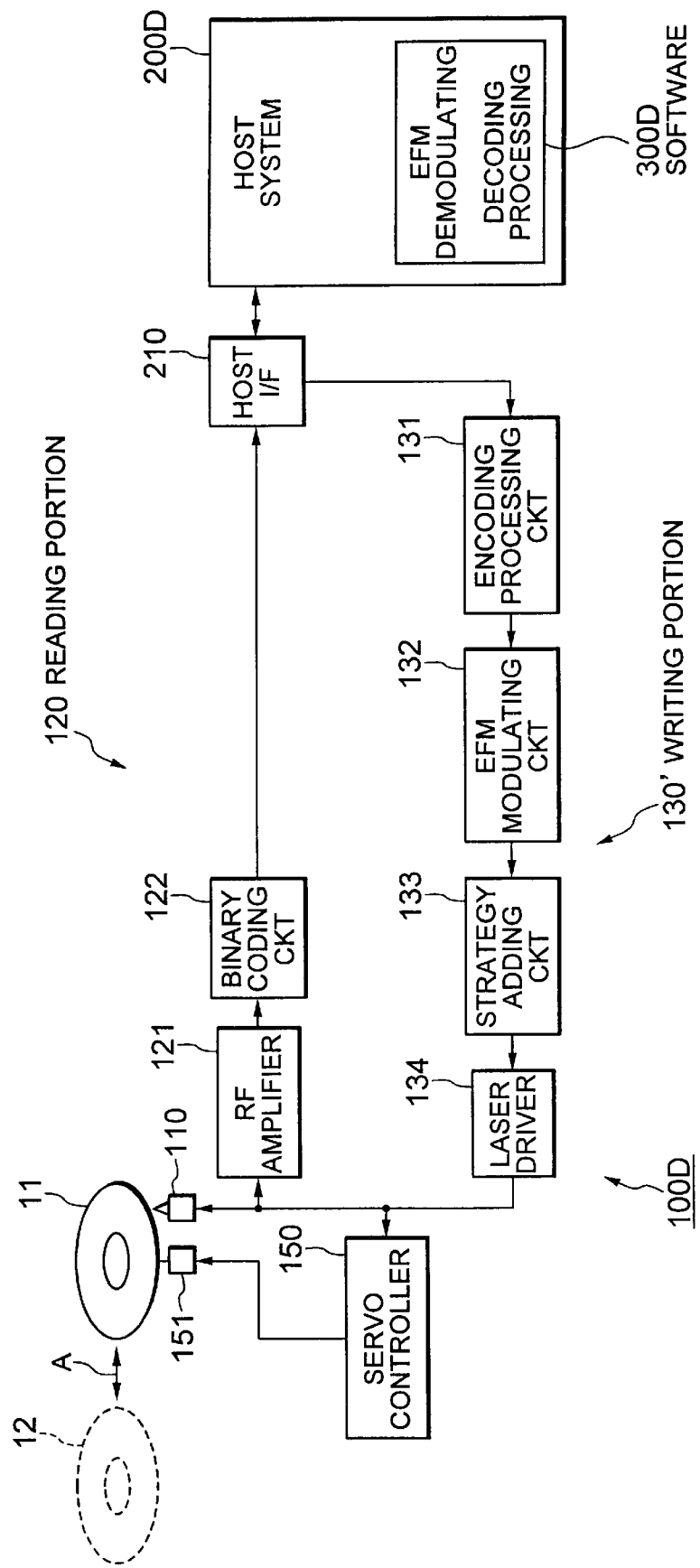
FIG. 11 is a block diagram showing an optical disc writing apparatus according to a fifth embodiment of this invention together with a host system connected thereto.

Referring to FIG. 11, the description will proceed to a simplified optical disc writing apparatus 100D according to a fifth embodiment of this invention. The illustrated simplified optical disc writing apparatus 100D is similar in structure and operation to the conventional optical disc writing apparatus 100' illustrated in FIG. 1 except that anly the reading portion is modified to that in illustrated in FIG. 2.

In addition, inasmuch as structure of the simplified optical disc writing apparatus 100D is modified from the conventional optical disc writing apparatus 100', the host system connected to this optical disc writing apparatus 100D is also different from that illustrated in FIG. 1 in the manner which will later become clear. Accordingly, the host system is depicted at a symbol of 200D.

That is, the simplified optical disc writing apparatus 100D according to the fifth embodiment is an apparatus obtained by deleting a part (123, 124) of the digital signal processing portion (123, 124, 131, 132) from the conventional optical disc writing apparatus 100'.

In the manner which is described above, inasmuch as the part (123, 124) of the digital signal processing portion (123, 124, 131, 132) is deleted from the conventional optical writing apparatus 100', in place of this, the host system 200D carries out, by using software 300, a processing carried out by this part (123, 124) of the digital signal processing portion (123, 124, 131, 132).

At any rate, inasmuch as the part (123, 124) of the digital signal processing portion (123, 124, 131, 132) contained in the conventional optical disc writing apparatus 100' is deleted from the conventional optical disc writing apparatus 100', it is possible for the simplified optical disc writing apparatus 100D according to the fifth embodiment of this invention to reduce the number of parts in comparison with the conventional optical disc writing apparatus 100' and it results in simplifying circuitry in the optical disc writing apparatus 100D.

Figure 12:
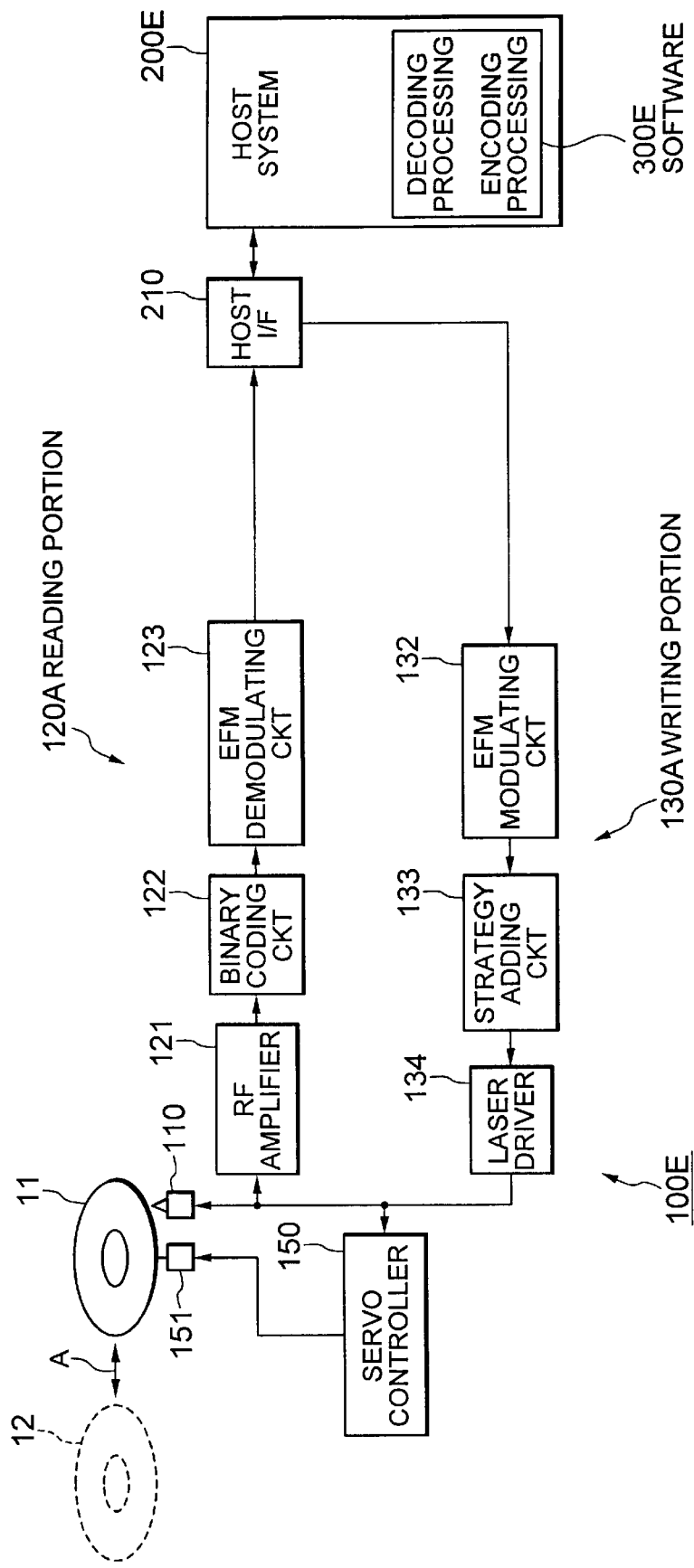
FIG. 12 is a block diagram showing an optical disc writing apparatus according to a sixth embodiment of this invention together with a host system connected thereto.

Referring to FIG. 12, the description will proceed to a simplified optical disc writing apparatus 100E according to a sixth embodiment of this invention. The illustrated simplified optical disc writing apparatus 100 is similar in structure and operation to the conventional optical disc writing apparatus 100' illustrated in FIG. 1 except that the reading portion is modified into that illustrated in FIG. 8 and the writing portion is modified into that illustrated in FIG. 9.

In addition, inasmuch as structure of the simplified optical disc writing apparatus 100E is modified from the conventional optical disc writing apparatus 100', the host system connected to this optical disc writing apparatus 100E is also different from that illustrated in FIG. 1 in the manner which will later become clear. Accordingly, the host system is depicted at a symbol of 200E.

That is, the simplified optical disc writing apparatus 100E according to the sixth embodiment is an apparatus obtained by deleting a part (124, 131) of the digital signal processing portion (123, 124, 131, 132) from the conventional optical disc writing apparatus 100'.

In the manner which is described above, inasmuch as the part (124, 131) of the digital signal processing portion (123, 124, 131, 132) is deleted from the conventional optical writing apparatus 100', in place of this, the host system 200E carries out, by using software 300E, a processing carried out by this part (124, 131) of the digital signal processing portion (123, 124, 131, 132).

At any rate, inasmuch as the part (124, 131) of the digital signal processing portion (123, 124, 131, 132) contained in the conventional optical disc writing apparatus 100' is deleted from the conventional optical disc writing apparatus 100', it is possible for the simplified optical disc writing apparatus 100E according to the sixth embodiment of this invention to reduce the number of parts in comparison with the conventional optical disc writing apparatus 100' and it results in simplifying circuitry in the optical disc writing apparatus 100E.

Figure 13:
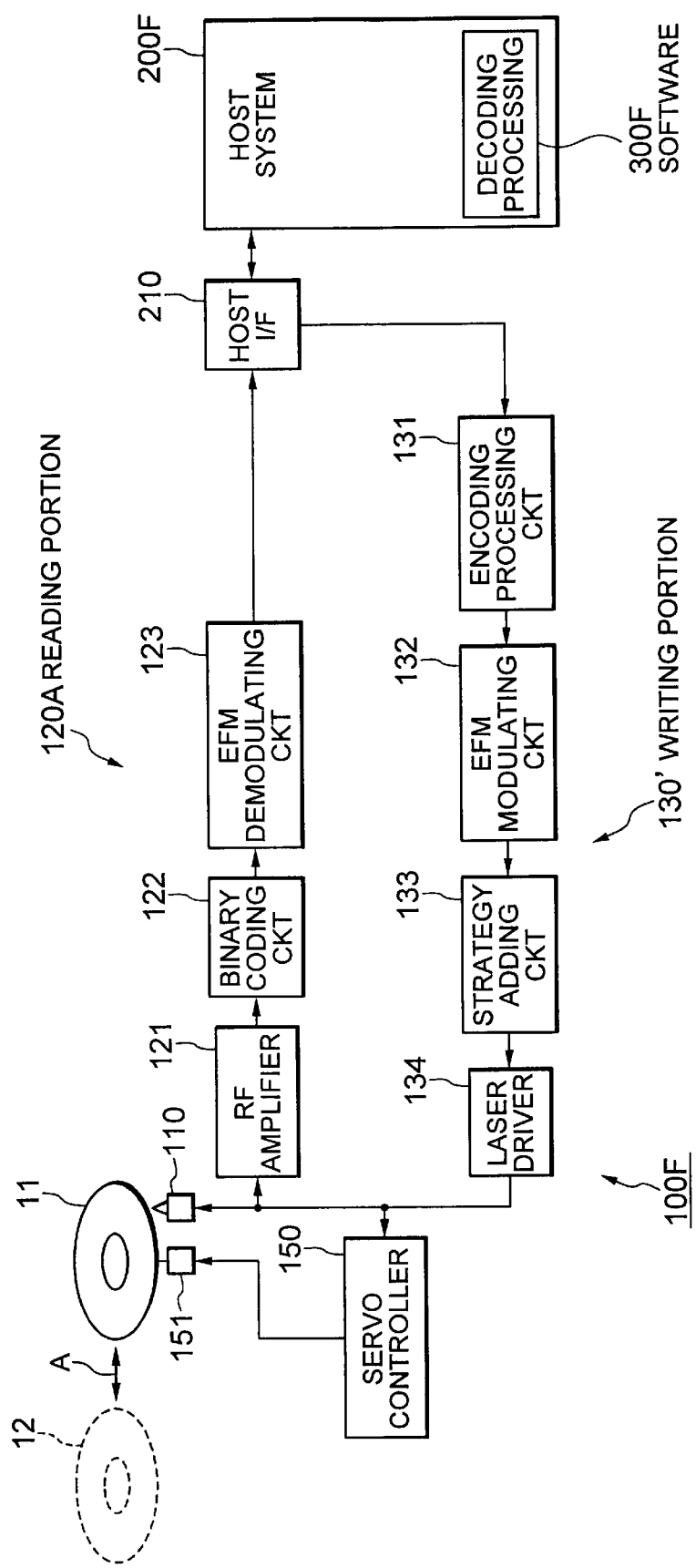
FIG. 13 is a block diagram showing an optical disc writing apparatus according to a seventh embodiment of this invention together with a host system connected thereto.

Referring to FIG. 13, the description will proceed to a simplified optical disc writing apparatus 100F according to a seventh embodiment of this invention. The illustrated simplified optical disc writing apparatus 100F is similar in structure and operation to the conventional optical disc writing apparatus 100' illustrated in FIG. 1 except that only the reading portion is modified into that in illustrated in FIG. 8.

In addition, inasmuch as structure of the simplified optical disc writing apparatus 100F is modified from the conventional optical disc writing apparatus 100', the host system connected to this optical disc writing apparatus 100F is also different from that illustrated in FIG. 1 in the manner which will later become clear. Accordingly, the host system is depicted at a symbol of 200F.

That is, the simplified optical disc writing apparatus 100F according to the seventh embodiment is an apparatus obtained by deleting a part (124) of the digital signal processing portion (123, 124, 131, 132) from the conventional optical disc writing apparatus 100'.

In the manner which is described above, inasmuch as the part (124) of the digital signal processing portion (123, 124, 131, 132) is deleted from the conventional optical writing apparatus 100', in place of this, the host system 200F carries out, by using software 300F, a processing carried out by this part (124) of the digital signal processing portion (123, 124, 131, 132).

At any rate, inasmuch as the part (124) of the digital signal processing portion (123, 124, 131, 132) contained in the conventional optical disc writing apparatus 100' is deleted from the conventional optical disc writing apparatus 100', it is possible for the simplified optical disc writing apparatus 100F according to the seventh embodiment of this invention to reduce the number of parts in comparison with the conventional optical disc writing apparatus 100' and it results in simplifying circuitry in the optical disc writing apparatus 100F.

Figure 14:
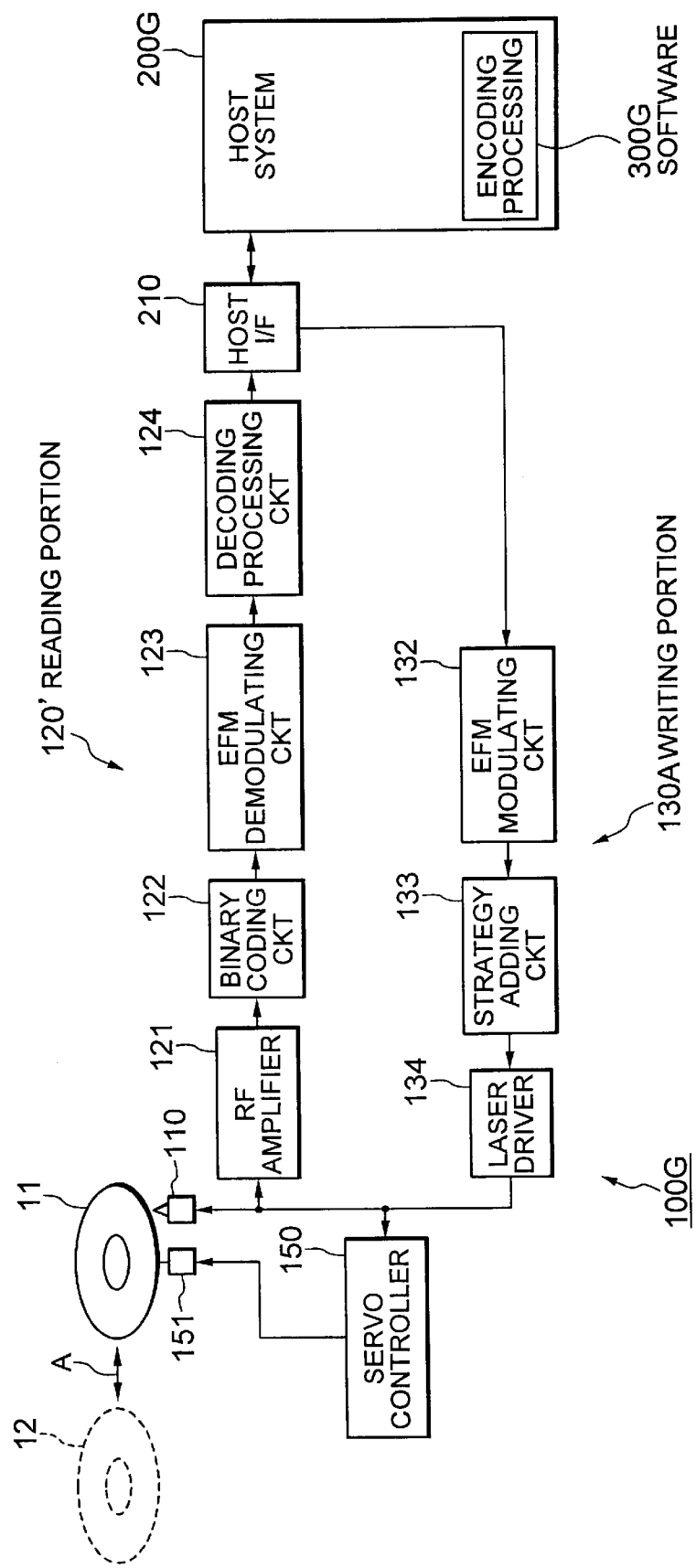
FIG. 14 is a block diagram showing an optical disc writing apparatus according to an eighth embodiment of this invention together with a host system connected thereto.

Referring to FIG. 14, the description will proceed to a simplified optical disc writing apparatus 100G according to an eighth embodiment of this invention. The illustrated simplified optical disc writing apparatus 100G is similar in structure and operation to the conventional optical disc writing apparatus 100' illustrated in FIG. 1 except that only the writing portion is modified into that illustrated in FIG. 9.

In addition, inasmuch as structure of the simplified optical disc writing apparatus 100G is modified from the conventional optical disc writing apparatus 100', the host system connected to this optical disc writing apparatus 100G is also different from that illustrated in FIG. 1 in the manner which will later become clear. Accordingly, the host system is depicted at a symbol of 200G.

That is, the simplified optical disc writing apparatus 100G according to the eighth embodiment is an apparatus obtained by deleting the part (131) of the digital signal processing portion (123, 124, 131, 132) from the conventional optical disc writing apparatus 100'.

In the manner which is described above, inasmuch as the part (131) of the digital signal processing portion (123, 124, 131, 132) is deleted from the conventional optical writing apparatus 100', in place of this, the host system 200G carries out, by using software 300G, a processing carried out by this part (131) of the digital signal processing portion (123, 124, 131, 132).

At any rate, inasmuch as the part (131) of the digital signal processing portion (123, 124, 131, 132) contained in the conventional optical disc writing apparatus 100' is deleted from the conventional optical disc writing apparatus 100', it is possible for the simplified optical disc writing apparatus 100G according to the eighth embodiment of this invention to reduce the number of parts in comparison with the conventional optical disc writing apparatus 100' and it results in simplifying circuitry in the optical disc writing apparatus 100G.

While this invention has thus far been described in conjunction with preferred embodiments thereof, it is to be understood that modifications will be apparent to those skilled in the art without departing from the sprit of the invention.

What is claimed is:

1. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for.producing said laser driving signal in response to the strategy added signal, wherein said optical disc writing apparatus supplies the binary coded signal to said host system;

wherein said optical disc writing apparatus controls said host system to carry out, by using said software, an EFM demodulating processing for EFM demodulating the binary coded signal to produce EFM demodulated data and a decoding processing for decoding the EFM demodulated data, and said optical disc writing apparatus controls said host system to carry out, by using said software, an encoding processing for encoding user data to be written to produce encoding processed data and an EFM modulating processing for EFM modulating the encoding processed data to produce the EFM modulated signal; and wherein said optical disc writing apparatus receives the EFM modulated signal from said host system.

2. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus further comprises an EFM demodulating circuit for EFM demodulating the binary coded signal to produce EFM demodulated data, and said optical disc writing apparatus supplies the EFM demodulated data to said host system;

wherein said optical disc writing apparatus controls said host system to carry out, by using said software, a decoding processing for decoding the EFM demodulated data, and said optical disc writing apparatus controls said host system to carry out, by using said software, an encoding processing for encoding user data to be written to produce encoding processed data and an EFM modulating processing for EFM modulating the encoding processed data to produce the EFM modulated signal; and wherein said optical disc writing apparatus receives the EFM modulated signal from said host system.

3. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus supplies the binary coded signal to said host system;

wherein said optical disc writing apparatus controls said host system to carry out, by using said software, an EFM demodulating processing for EFM demodulating the binary coded signal to produce EFM demodulated data and a decoding processing for decoding the EFM demodulated data, and said optical disc writing apparatus controls said host system to carry out, by using said software, an encoding processing for encoding user data to be written to produce encoding processed data; and wherein said optical disc writing apparatus receives the encoding processed data from said host system, and said optical disc writing apparatus further comprises an EFM modulating circuit for EFM modulating the encoding processed data to produce the EFM modulated signal.

4. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus further comprises an EFM demodulating circuit for EFM demodulating the binary coded signal to produce EFM demodulated data and a decoding processing circuit for decoding the EFM demodulated data to produce decoding processed data, and said optical disc writing apparatus supplies the decoding processed data to said host system;

wherein said optical disc writing apparatus controls said host system to carry out, by using said software, an encoding processing for encoding user data to be written to produce encoding processed data and an EFM modulating processing for EFM modulating the encoding processed data to produce the EFM modulated signal; and wherein said optical disc writing apparatus receives the EFM modulated signal from said host system.

5. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus supplies the binary coded signal to said host system;

wherein said optical disc writing apparatus controls said host system to carry out, by using said software, an EFM demodulating processing for EFM demodulating the binary coded signal to produce EFM demodulated data and a decoding processing for decoding the EFM demodulated data; and wherein said optical disc writing apparatus receives user data to be written from said host system, and said optical disc writing apparatus further comprises an encoding processing circuit for encoding the user data to produce encoding processed data and an EFM modulating circuit for EFM modulating the encoding processed data to produce the EFM modulated signal.

6. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus further comprises an EFM demodulating circuit for EFM demodulating the binary coded signal to produce EFM demodulated data, and said optical disc writing apparatus supplies the EFM demodulated data to said host system;

wherein said optical disc writing apparatus controls said host system to carry out, by using said software, a decoding processing for decoding the EFM demodulated data, and said optical disc writing apparatus controls said host system to carry out, by using said software, an encoding processing for encoding user data to be written to produce encoding processed data; and wherein said optical disc writing apparatus receives the encoding processed data from said host system, and said optical disc writing apparatus further comprises an EFM modulating circuit for EFM modulating the encoding processed data to produce the EFM modulated signal.

7. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus further comprises an EFM demodulating circuit for EFM demodulating the binary coded signal to produce EFM demodulated data, and said optical disc writing apparatus supplies the EFM demodulated data to said host system;

wherein said optical disc writing apparatus controls said host system to carry out, by using said software, a decoding processing for decoding the EFM demodulated data; and wherein said optical disc writing apparatus receives user data to be written from said host system, and said optical disc writing apparatus further comprises an encoding processing circuit for encoding the user data to produce encoding processed data and an EFM modulating circuit for EFM modulating the encoding processed data to produce the EFM modulated signal.

8. An optical disc writing apparatus that is connectable to a host system and that reads data from a first optical disc, supplies the read data to said host system, and writes data supplied from said host system in a second optical disc, said optical disc writing apparatus comprising:

a pickup for reading data out of said first optical disc to produce a radio frequency (RF) signal, and writing, in response to a laser driving signal, data in said second optical disc;

a radio frequency (RF) amplifier for amplifying the RF signal to produce an amplified signal;

a binary coding circuit for binary coding the amplified signal to produce a binary coded signal;

a strategy adding circuit for adding a strategy to an eight to fourteen modulation (EFM) modulated signal supplied from said host system to produce a strategy added signal; and a laser driver for producing said laser driving signal in response to the strategy added signal, wherein said optical disc writing apparatus further comprises an EFM demodulating circuit for EFM demodulating the binary coded signal to produce EFM demodulated data and a decoding processing circuit for decoding the EFM demodulated data to produce decoding processed data, and said optical disc writing apparatus supplies the decoding processed data to said host system;

wherein said optical disc writing apparatus controls said host system to carry out, by using said software, an encoding processing for encoding user data to be written to produce encoding processed data; and wherein said optical disc writing apparatus receives the encoding processed data from said host system, and said simplified optical disc writing apparatus further comprises an EFM modulating circuit for EFM modulating the encoding processed data to produce the EFM modulated signal.

* * * * *